United States Patent [19]
Zubko

[11] Patent Number: 6,054,779
[45] Date of Patent: Apr. 25, 2000

[54] ELECTRICAL POWER CONNECTOR FOR TANDEM TRAILERS

[75] Inventor: Ronald L. Zubko, Ossian, Ind.

[73] Assignee: Strick Corporation, Fairless Hills, Pa.

[21] Appl. No.: 09/059,781

[22] Filed: Apr. 14, 1998

[51] Int. Cl.[7] ............................... B60L 1/14; B60Q 1/44
[52] U.S. Cl. ........................ 307/10.8; 361/147; 340/479; 439/35
[58] Field of Search ................... 307/9.1, 10.1, 307/10.8, 157, 147; 315/77; 280/422, 423.1, DIG. 14; 439/34–36; 340/431, 479; 201/70, 71–82

[56] References Cited

U.S. PATENT DOCUMENTS

| | | |
|---|---|---|
| 399,326 | 3/1889 | Griggs . |
| 625,828 | 5/1899 | Case . |
| 1,492,181 | 4/1924 | Riley et al. . |
| 2,046,976 | 7/1936 | Sorensen ................................ 171/97 |
| 2,496,208 | 1/1950 | Hasselbaum ........................... 173/328 |
| 2,525,086 | 10/1950 | Wright et al. ......................... 173/326 |
| 2,660,679 | 11/1953 | Hunt ........................................ 307/10 |
| 2,852,273 | 9/1958 | Hudson .................................. 280/420 |
| 3,046,515 | 7/1962 | Appleton ............................... 339/111 |
| 3,059,073 | 10/1962 | French, Jr. ........................... 200/51.09 |
| 3,486,799 | 7/1968 | Greentree .................................. 303/7 |
| 3,601,660 | 8/1971 | Brandt et al. ........................... 317/99 |
| 3,915,476 | 10/1975 | Burkle .................................... 280/422 |
| 4,005,313 | 1/1977 | Tibbits ................................... 307/10 R |
| 4,061,407 | 12/1977 | Snow ................................... 339/75 P |
| 4,072,381 | 2/1978 | Burkhart et al. ..................... 339/29 R |
| 4,154,495 | 5/1979 | Crewse .................................. 339/75 P |
| 4,245,875 | 1/1981 | Shaffer et al. ...................... 339/44 M |
| 4,390,228 | 6/1983 | Schleusner ........................ 339/113 R |
| 4,460,811 | 7/1984 | Murr et al. ............................ 200/51.03 |
| 4,620,109 | 10/1986 | Kummer ................................. 307/9.1 |
| 4,718,853 | 1/1988 | Orbanic .................................... 439/35 |
| 4,770,644 | 1/1988 | Feder ..................................... 439/166 |
| 4,784,610 | 11/1988 | Stuart .................................... 439/144 |
| 4,842,532 | 6/1989 | Krause .................................. 439/174 |
| 4,857,807 | 8/1989 | Hargis ..................................... 315/77 |
| 5,039,869 | 8/1991 | Willikens ............................. 307/10.8 |
| 5,220,139 | 6/1993 | Leleve ................................ 200/51.009 |
| 5,285,113 | 2/1994 | Schlich .................................. 307/9.1 |
| 5,302,141 | 4/1994 | O'Reilly et al. ...................... 439/680 |
| 5,385,476 | 1/1995 | Jasper ..................................... 439/38 |
| 5,397,924 | 3/1995 | Gee et al. .............................. 307/9.1 |
| 5,775,712 | 7/1998 | Link et al. ............................. 280/422 |

FOREIGN PATENT DOCUMENTS

| | | |
|---|---|---|
| 0 159 505 A2 | 3/1985 | European Pat. Off. ........ H01R 13/70 |
| 0 539 860 A1 | 5/1993 | European Pat. Off. ........ B62D 53/12 |
| 1220920 | 10/1961 | Germany .............................. 200/51.1 |
| 225276 | 11/1924 | United Kingdom . |
| 783547 | 9/1957 | United Kingdom . |

*Primary Examiner*—Jeffrey Gaffin
*Assistant Examiner*—Kim Huynh
*Attorney, Agent, or Firm*—Seidel, Gonda, Lavorgna & Monaco, PC

[57] ABSTRACT

A trailer is provided having an electrical power connector for coupling a multi-conductor jumper cable plug between trailers connected in tandem, the connector comprising a multi-prong electrical power receptacle mounted to a trailer. One prong of the receptacle is electrically connected with the electrical power to the rear stop lights of the trailer. The connector further contains a switch for interrupting electrical power to the rear stop lights of the trailer when the jumper cable plug is connected to the receptacle while allowing electrical power to pass from the prong into the plug to supply electrical power to rear stop lights of a following trailer.

4 Claims, 4 Drawing Sheets

ELECTRICAL POWER CONNECTOR FOR TANDEM TRAILERS

FIELD OF THE INVENTION

This invention relates generally to the field of power supply for automotive vehicles, and particularly to power supply connection between trailers and tractors.

BACKGROUND OF THE INVENTION

In the trucking industry, trailers may be coupled together into tandem or triple unit combinations and hauled over the road by tractor units.

When multiple trailers are coupled together into tandem or triple combinations, the safety lighting on the rear of the intermediate trailers is blocked from view by the last trailer. However, these lights continue to operate and draw current from the trailers' electrical supply.

In most instances, all electrical systems on the tractor-trailer combination are powered by the tractor's engine-mounted alternator, with starting and stand-by power from a storage battery. Electrical power from the tractor is distributed to the trailer combination through a standardized multi-circuit cable to provide interchangeability between tractors and trailers. Per trucking industry convention, seven circuits are color coded and oriented radially within the cable and receptacle plugs. With this established convention, control of power transmission into any one of the seven circuits can be maintained at the plug/receptacle interface.

To continue the electrical power cable interconnecting the lead trailer to any following trailers, a matching receptacle is positioned at the rear of all trailers intended for tandem or triple combinations. This rear receptacle is connected to the front mounted trailer receptacle of the next trailer in line by a color-coded wiring harness. As a result, two sets of trailer lighting in a tandem combination, or three sets of trailer lighting in a triple combination, draw current from the tractor.

In addition to safety lighting, there is a growing use of anti-lock braking systems (ABS) on trailers, as regulations requiring trailer ABS are mandatory. The ABS utilize electrical power to sense, apply and control the trailer air-brake system, which is activated by the tractor driver. Regulations governing ABS on tractor trailers require a new inter-related brake system that requires both electrical and air power supplied by the tractor. In the ABS equipped combinations, not only the trailer, but also the connecting converter dollies will require electrical power to activate the air brake systems and trailer safety lighting. The primary ABS electrical power is to be provided by a separate full time continuous power circuit. A second, back-up ABS power source is to be supplied by the industry standard circuit which currently only powers the trailer and dolly stop lights.

SUMMARY OF THE INVENTION

A trailer is provided having an electrical power connector for coupling a multi-conductor jumper cable between trailers connected in tandem, the connector comprising a receptacle housing adapted for insertion of a multi-conductor jumper cable plug and a multi-prong electrical power receptacle within the housing. One prong of the receptacle is associated with the electrical power to the rear lights of the trailer. The connector further comprises a switch for interrupting electrical power to the rear stop lights of the trailer when the jumper cable plug is connected to the receptacle while allowing electrical power to pass from the prong into the plug to supply electrical power to rear lights of a following trailer.

In a preferred embodiment of the invention, one prong of the receptacle is also associated with the electrical power to an anti-lock brake system of the trailer, and the switch does not interrupt electrical power to the anti-lock brake system. Preferably, the switch is normally closed, and opened when a jumper cable plug is connected to the receptacle.

DETAILED DESCRIPTION OF THE INVENTION

Figure 1:
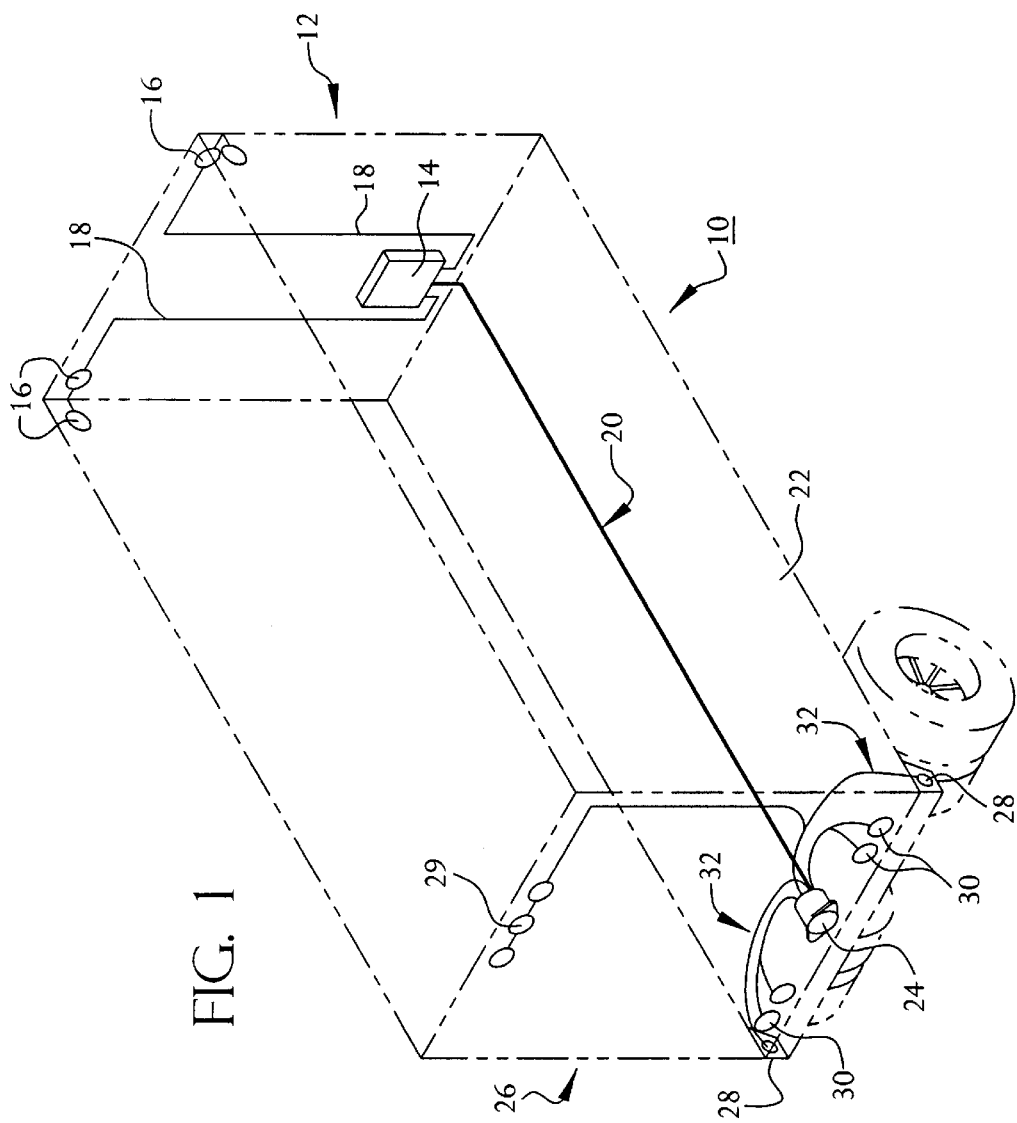
FIG. 1 is an isometric view of a trailer's lighting system.

FIG. 1 shows the general layout of the safety lighting system of a trailer 10. At the front end 12 of the trailer is a front receptacle 14. The front receptacle 14 is used to connect a multi-wire cable or wiring harness (not shown) from the tractor.

Front marker lights 16 are located in opposite top corners of the trailer's front end, and are provided electrical power via cables 18 emanating from the front receptacle 14. A main multi-wire cable 20 runs longitudinally along the floor 22 of the trailer from the front receptacle 14 to a rear receptacle 24. Electrical power is provided to the rear marker lights 28, identification lights 29, and stop, tail, and turn lights 30, from the rear receptacle 24 via cables 32.

Figure 2:
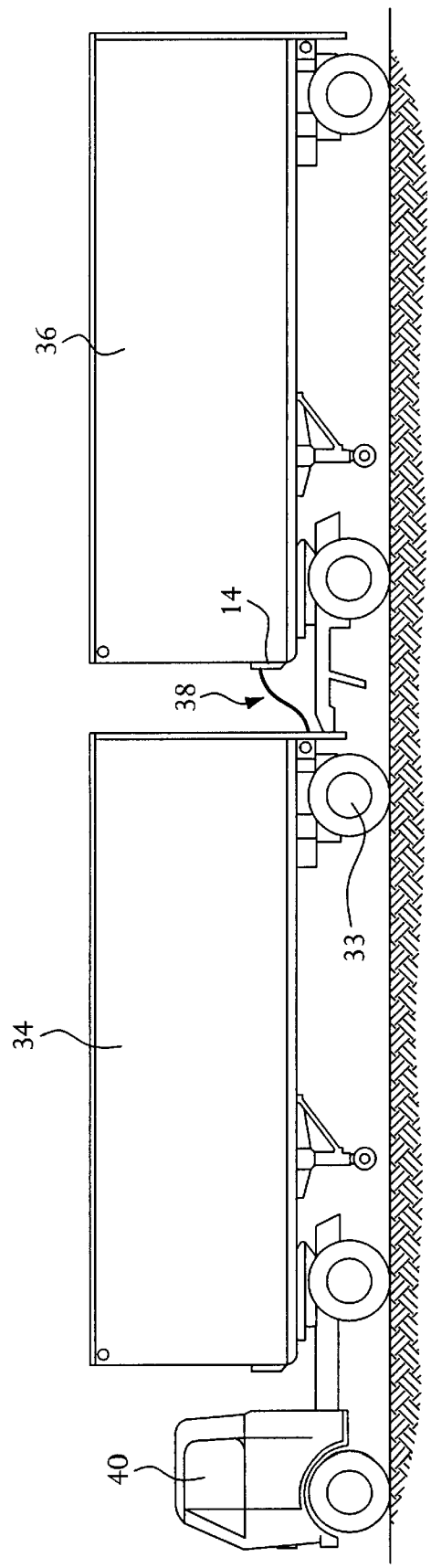
FIG. 2 is an elevational view of two trailers joined in a tandem fashion.

FIG. 2 shows two trailers in tandem alignment. The leading trailer 34 and the second trailer 36 are electrically connected by a power cord or jumper cable assembly 38 between the rear receptacle of the leading trailer and the front receptacle of the second trailer.

Figure 3:
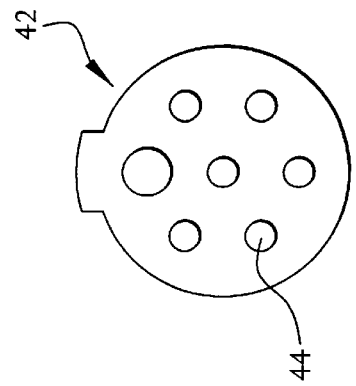
FIG. 3 is a top plan view of a standard seven-conductor electrical connector.

The rear receptacle 24 may be a standardized seven-conductor electrical connector receptacle socket 42 for a tractor-trailer jumper cable, as standardized by the Society of Automotive Engineers (SAE Standard J560 JUN93), with a configuration as shown in FIG. 3. The connector socket 42 contains six male (prong) contacts 44 radially located at approximate 60° intervals around the arc of the connector and a seventh male contact 44 in the center. (Analogizing to a clock face, the male contacts 44 are located at 12, 2, 4, 6, 8, and 10 o'clock positions and the center position). The seven contacts are color coded in the following manner: beginning at the top position and moving clockwise, white, black, yellow, red, green, brown and blue in the center. Corresponding female contacts are on a plug of the jumper cable assembly 38.

Figure 4:
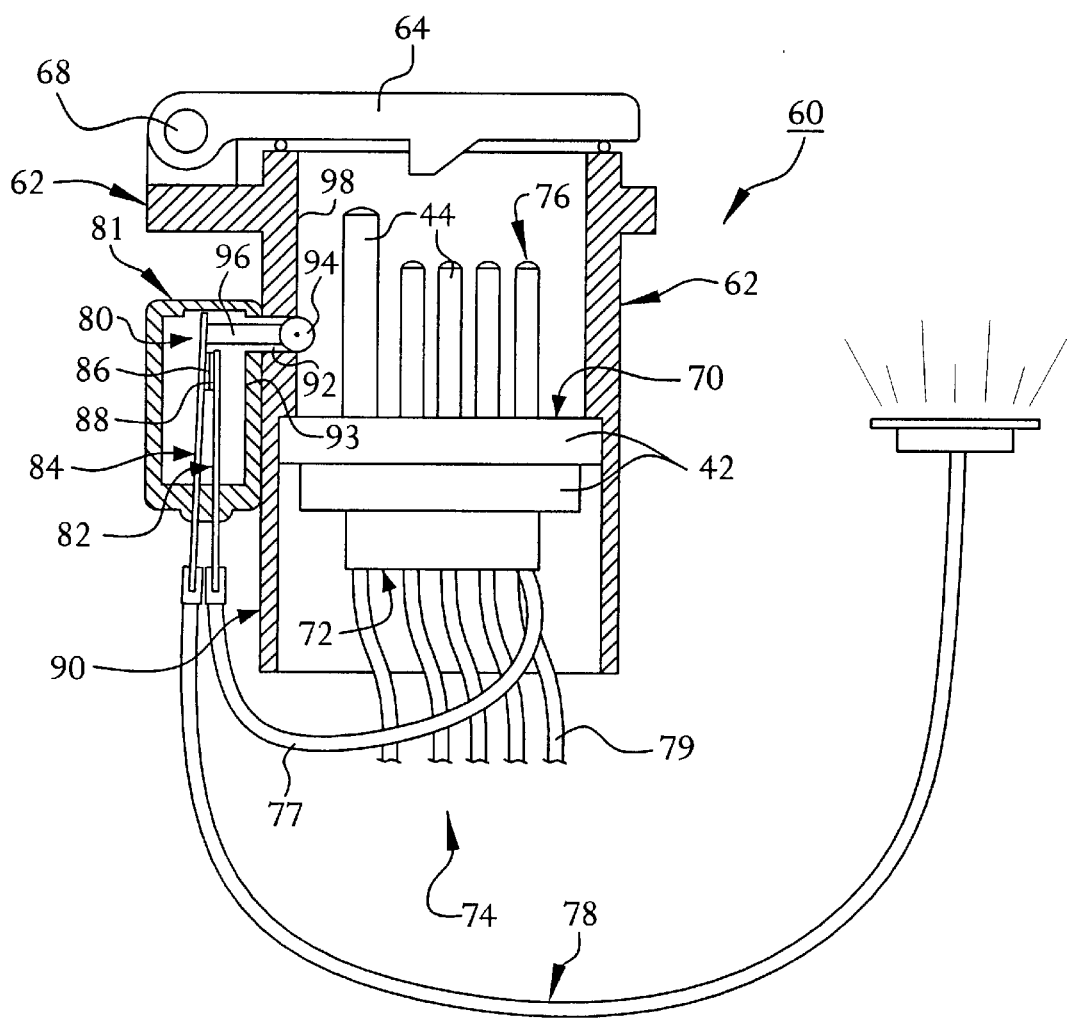
FIG. 4 is a partial sectional view of the power supply connector plug of the present invention, particularly showing a closed switch.
Figure 5:
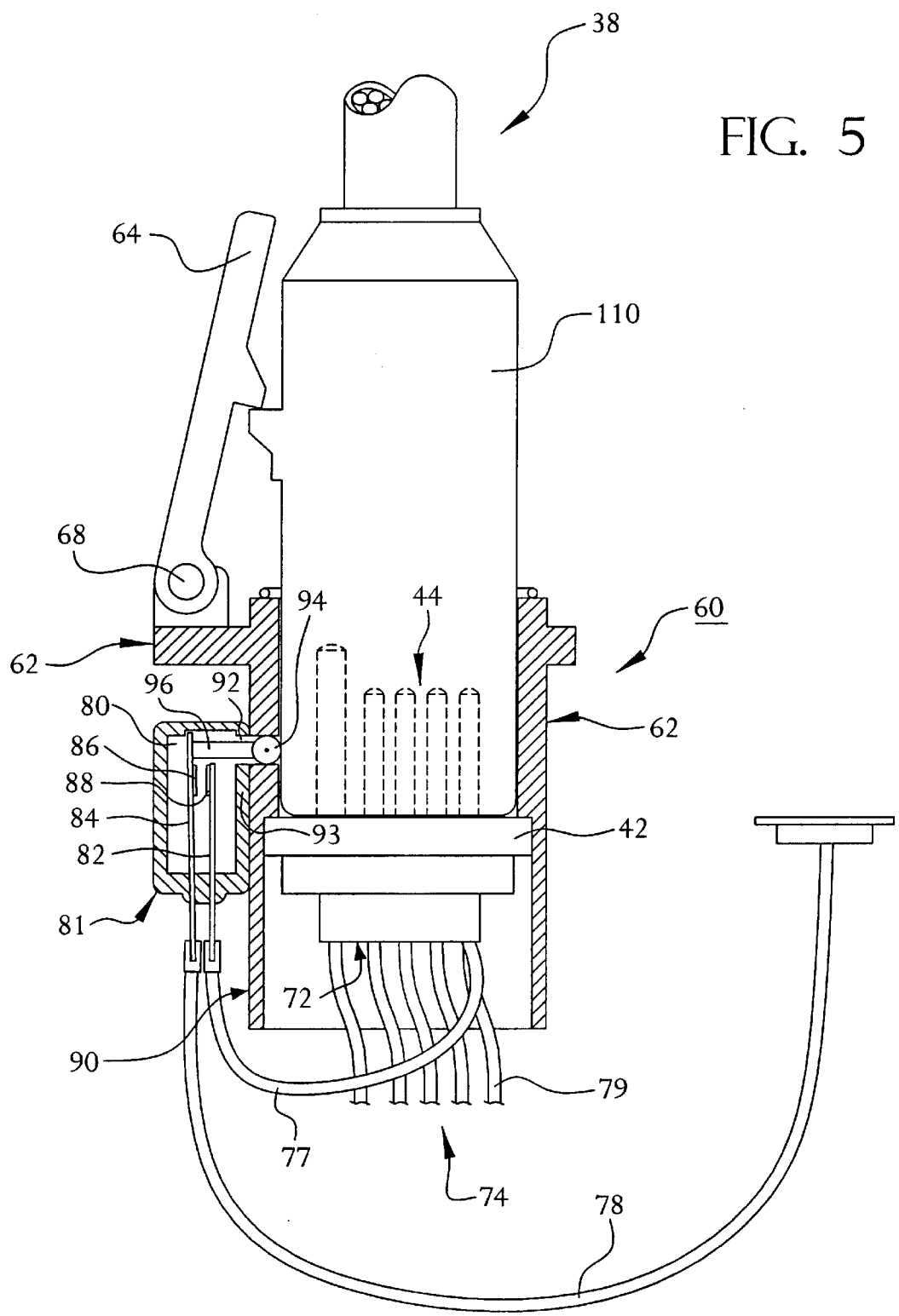
FIG. 5 is a partial sectional view of the power supply connector plug of the present invention, particularly showing an open switch.

The power supply connector of the present invention is a modification of the standard receptacle, as shown in FIGS. 4 and 5 and generally indicated by the numeral 60. The connector 60 includes a housing 62 with a hinged cover 64, which houses the receptacle socket 42 containing the seven male contacts 44. The housing is generally cylindrical in shape and fashioned from cast aluminum or plastic. The cover 64 is hingeably attached to the housing 62 at a hinge joint 68. In the closed (unconnected) position of FIG. 4, the cover 64 lies flat across the top of the connector 60, closing off its upper end.

As described earlier with reference to FIG. 1, electrical power is provided to the stop, tail, and turn ("S/T/T") lights 30 from the rear receptacle 24 via cables 32. Primary power from blue (number seven) circuit to ABS 33 (FIG. 2) and back-up power for ABS is conventionally derived from the cable associated with the red (number four) contact of the standardized seven-conductor receptacle. [Following the standardized receptacle: white (number one)—ground return to towing vehicle; black (number two)—clearance, side marker, and identification lamps; yellow (number three)—left turn signal and hazard lamps; green (number five)—right turn signal and hazard lamps; brown (number six)—tail and license plate lamps; and blue (number seven)—ABS power]. In the present invention, however, the connection to the stop lights is re-routed via an electrical lead 77 that couples the red male contact 76 to a switch 80. The stop light cable (shown as 78 in FIGS. 4 and 5) is also connected to switch 80 in the manner described below.

The switch 80 is enclosed in a housing 81 secured to the exterior of the connector housing 62. The switch comprises a first breaker bar 82 and a longer second breaker bar 84, each breaker bar 82, 84 having a contact button 86, 88, preferably gold-plated. The lead 77 is connected to a terminal end of a conductive breaker bar 82, and cable 78 is connected to a terminal end of another conductive breaker bar 84. An aperture 92 through the switch housing 81 and the connector plug housing 62 contains a roller 94 and a lever 96 to actuate, or open and close the switch 80. The roller 94 and lever 96 assembly serve as an actuator. When the switch 80 is closed, as shown in FIG. 4, the roller 94 is positioned such that about one-half of its cross-sectional diameter extends into the interior 98 of the connector plug housing 62. The lever 96 is connected to the roller 94 and extends through the aperture 92 to connect to the open end of the second breaker bar 84. The breaker bars are spring-biased to the closed position of FIG. 4. When the switch 80 is closed, the electrical circuit providing power to the rear stop lights on the trailer is closed, thus routing power to the lights when the appropriate control switches in the tractor are activated.

When a second trailer 36 is connected in tandem with the first trailer 34, a jumper cable 38 is inserted into the connector 60 as shown in FIG. 5. The cover 64 is raised to enable the insertion. The jumper cable 38 is a standard seven conductor jacketed cable for truck-trailer connections (SAE J1067) having a cable plug 110 with seven female contacts that engage the corresponding seven male contacts 44 of the connector plug 60. The insertion of the plug 110 into the connector 62 pushes the roller 94 into the aperture 92, away from the receptacle housing 62, which in turn causes the lever 96 to move up overcoming the spring force on the breaker bars and causing the contacts 86, 88 to separate, thus opening the switch 80. The open switch 80 interrupts current from being supplied to the stop lights of the first trailer. As a result, approximately 4 amps of current is saved, and may be diverted for other uses such as the ABS circuitry.

Although the present invention has been described in detail in connection with the above embodiments, it should be understood that there can be other embodiments and that variations can be made by those skilled in the art without departing from the spirit of the invention. For example, the function of the switch 80 may instead be accomplished by a different type of contact switch, or by a proximity sensor switch or other type of current or power interrupter, all of which should be encompassed by the term "switch" as used in the claims. The switch could also be activated by opening of the cover instead of insertion of the plug. The invention may also be easily modified for incorporation in other multi-conductor cable standards, such as twelve, thirteen and fifteen conductor systems being considered as ISO future standards.

What is claimed is:

1. A first trailer having an electrical power connector for coupling a multi-conductor jumper cable plug from a second trailer connected in tandem, the connector comprising:

an electrical power receptacle mounted to a first trailer, the power receptacle having a plurality of contacts, one of the plurality of contacts of the receptacle electrically connected to rear stop lights of the first trailer;

a switch having open and closed positions, the switch for interrupting electrical power to the rear stop lights of the first trailer when the jumper cable plug from the second trailer is connected to the receptacle while allowing electrical power to pass from the contact into the plug to supply electrical power to rear stop lights of the second trailer; and a lever and roller actuator, wherein the insertion of the plug into the receptacle pushes the roller away from the receptacle causing the lever to pivot, said lever attached to the switch and resulting in the opening of the switch.

2. An electrical power connector for coupling a multi-conductor jumper cable plug between first and second trailers connected in tandem, the connector comprising:

an electrical power receptacle mounted on a first trailer, the receptacle having a plurality of contacts, one of the plurality of contacts electrically connected to rear stop lights of the first trailer;

a switch having open and closed positions, the switch for interrupting electrical power to the rear stop lights of the first trailer when the jumper cable plug is connected to the receptacle while allowing electrical power to pass from said contact into the plug to supply electrical power to rear stop lights of a second trailer;

wherein the switch is normally closed, permitting electrical power to pass to the rear stop lights of the first trailer, and is opened when a jumper cable plug from a following trailer is connected to the receptacle; and a lever and roller actuator, wherein the insertion of the plug into the receptacle housing pushes the lever and roller away from the receptacle housing causing the switch to open.

3. An electrical power connector for coupling a multi-conductor jumper cable plug between first and second trailers connected in tandem, the connector comprising:

an electrical power receptacle comprising a plurality of contacts mounted to a first trailer, one of the plurality of contacts of the receptacle electrically connected to rear stop lights of the first trailer having the receptacle mounted thereon;

a switch having open and closed positions, the switch for interrupting electrical power to the rear stop lights of the first trailer when the jumper cable plug is connected to the receptacle while enabling electrical power to pass from the contact into the plug to supply electrical power to rear stop lights of a second trailer;

a switch housing having a switch contained therein;

actuator situated in an aperture between the receptacle housing and the switch housing, wherein the insertion of the plug into the receptacle housing pushes the actuator away from the receptacle housing, causing the switch to open; and another of said plurality of contacts of the receptacle is electrically connected to an anti-lock brake system of the first trailer, wherein the switch for interrupting electrical power to the rear stop lights of the first trailer in the open position does not interrupt electrical power to the anti-lock brake system.

4. An electrical power connector as in claim 3, wherein the actuator is a lever and roller assembly.

* * * * *